(12) United States Patent
Chang

(10) Patent No.: US 7,293,760 B1
(45) Date of Patent: Nov. 13, 2007

(54) CABLE TIGHTENING DEVICE OPERATED CONVENIENTLY

(76) Inventor: Vincent Chang, 15-10, Lane 142, Sec. 5, Chang Nan Rd., Changhua City, Changhua Hsien (TW)

( * ) Notice: Subject to any disclaimer, the term of this patent is extended or adjusted under 35 U.S.C. 154(b) by 0 days.

(21) Appl. No.: 11/651,883

(22) Filed: Jan. 10, 2007

(51) Int. Cl.
*B21F 9/00* (2006.01)

(52) U.S. Cl. ............ 254/218; 254/223; 24/70 ST; 24/69 CT; 24/71 ST

(58) Field of Classification Search ........... 254/217, 254/218, 222, 223; 24/70 ST, 69 CT, 71 ST
See application file for complete search history.

(56) References Cited

U.S. PATENT DOCUMENTS 6,007,053 A * 12/1999 Huang .................. 254/247
6,641,116 B1 * 11/2003 Huang .................. 254/218
6,880,810 B1 * 4/2005 Hu ....................... 254/218

* cited by examiner

*Primary Examiner*—Emmanuel M Marcelo
(74) *Attorney, Agent, or Firm*—Alan Kamrath; Kamrath & Associates P.A.

(57) ABSTRACT

A cable tightening device includes a fixed unit, a rotation member, two opposite ratchet wheels, and a movable unit. The movable unit includes a movable member, a drive handle and two opposite torsion springs. Thus, the torsion springs are arranged on the movable member symmetrically to provide a predetermined elastic force to the drive handle to eliminate an oblique force produced during the movement of the drive handle, so that the push plates of the drive handle are slidable in the guide slots of the movable member smoothly and exactly without incurring deflection.

15 Claims, 7 Drawing Sheets

CABLE TIGHTENING DEVICE OPERATED CONVENIENTLY

BACKGROUND OF THE INVENTION

1. Field of the Invention

The present invention relates to a cable tightening device and, more particularly, to a cable tightening device for tightening or loosening a cable so as to bind or release a cargo.

2. Description of the Related Art

A cable tightening device is mounted on a wheeled vehicle having a larger size, such as a truck or the like, to tighten a cable which is wound around a cargo so as to tighten the cargo. A conventional cable tightening device comprises a fixed unit including a base member, a rotation member rotatably mounted on the base member of the fixed unit to wind or unwind a cable by rotation of the rotation member, two opposite ratchet wheels secured on two opposite ends of the rotation member to rotate the rotation member, and a movable unit including a movable member rotatably mounted on the rotation member, a drive handle mounted on the movable member and engaged with the ratchet wheels to push the ratchet wheels to rotate in a oneway direction when the movable member of the movable unit is rotatable relative to the base member of the fixed unit, and a torsion spring to provide an elastic force to push the drive handle toward the ratchet wheels. However, the elastic force applied by the torsion spring is not directed toward the ratchet wheels and has an oblique component, so that the drive handle is easily deflected during a long-term utilization due to action of the oblique component of the elastic force applied by the torsion spring. Thus, the drive handle is not operated smoothly and conveniently.

BRIEF SUMMARY OF THE INVENTION

In accordance with the present invention, there is provided a cable tightening device, comprising a fixed unit including a base member, a rotation member rotatably mounted on the base member of the fixed unit, two opposite ratchet wheels secured on two opposite ends of the rotation member to rotate the rotation member, and a movable unit including a movable member rotatably mounted on the rotation member and rotatable relative to the base member of the fixed unit, a drive handle mounted on and movable with the movable member and releasably engaged with the ratchet wheels to push the ratchet wheels to rotate in a oneway direction when the movable member of the movable unit is rotatable relative to the base member of the fixed unit, and two opposite torsion springs each biased between the movable member and the drive handle to push the drive handle toward the ratchet wheels.

The primary objective of the present invention is to provide a cable tightening device that is operated easily and conveniently.

Another objective of the present invention is to provide a cable tightening device, wherein the torsion springs of the movable unit are arranged on the movable member symmetrically to provide a predetermined elastic force to the drive handle to eliminate an oblique force produced during the movement of the drive handle, so that the push plates of the drive handle are slidable in the guide slots of the movable member smoothly and exactly without incurring deflection.

A further objective of the present invention is to provide a cable tightening device, wherein the limit block of each of the push plates of the drive handle is rested on a side of the respective guide slot of the movable member so that each of the push plates of the drive handle is slidable in the respective guide slot of the movable member solidly and stably.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
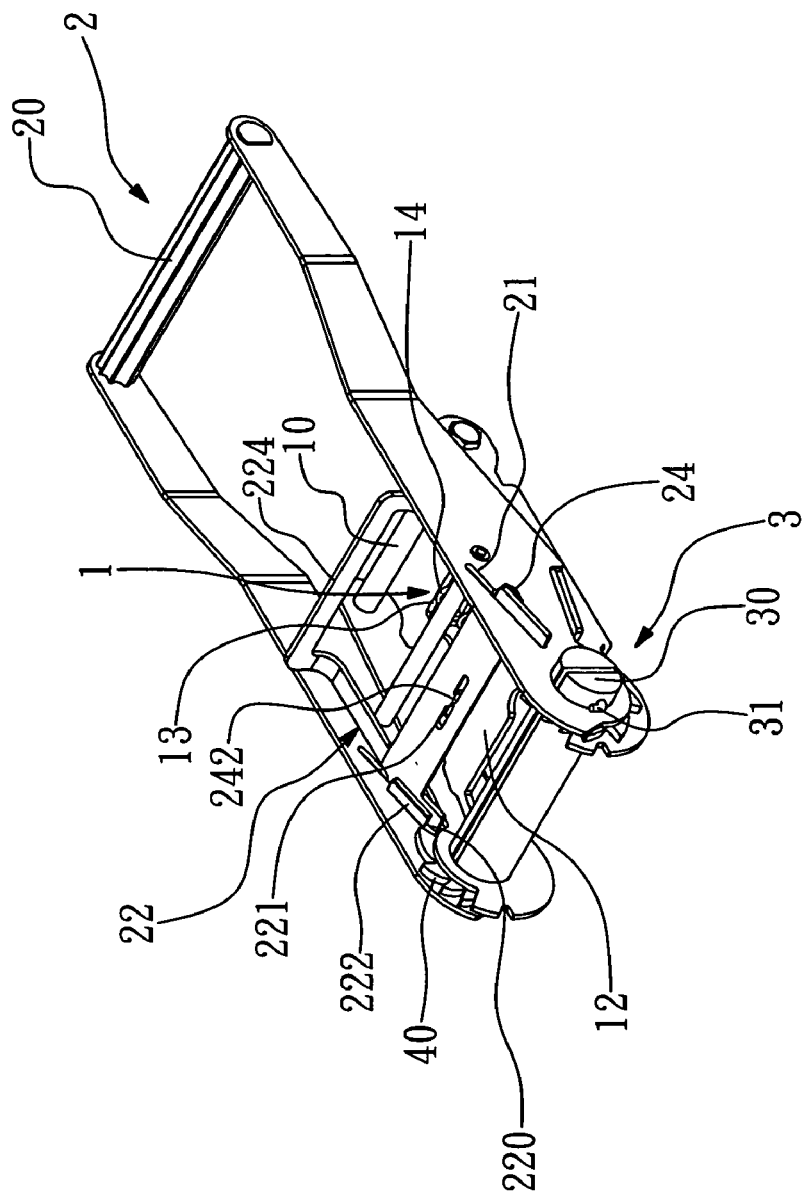
FIG. 1 is a perspective view of a cable tightening device in accordance with the preferred embodiment of the present invention.
Figure 2:
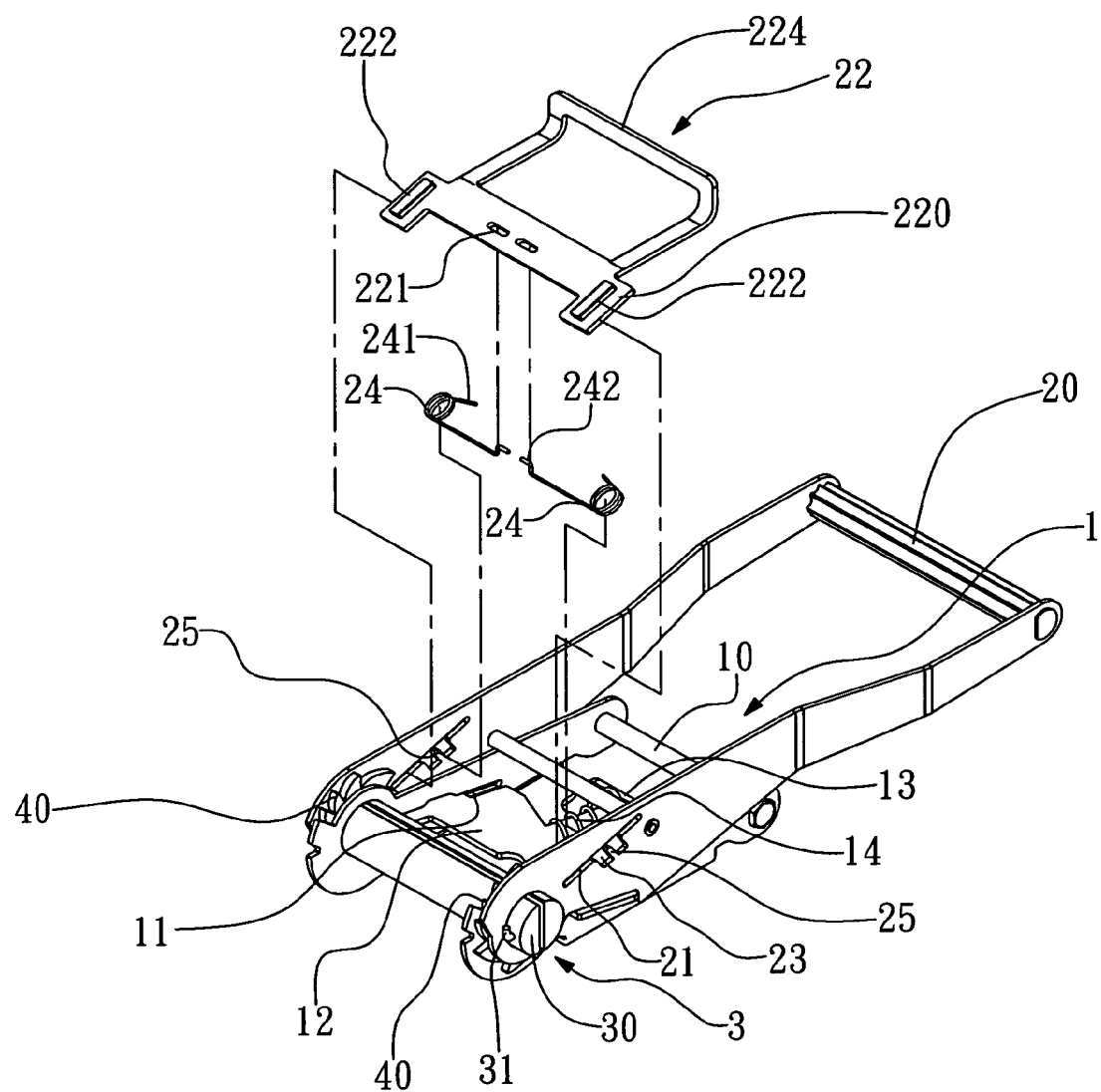
FIG. 2 is a partially exploded perspective view of the cable tightening device as shown in FIG. 1.
Figure 3:
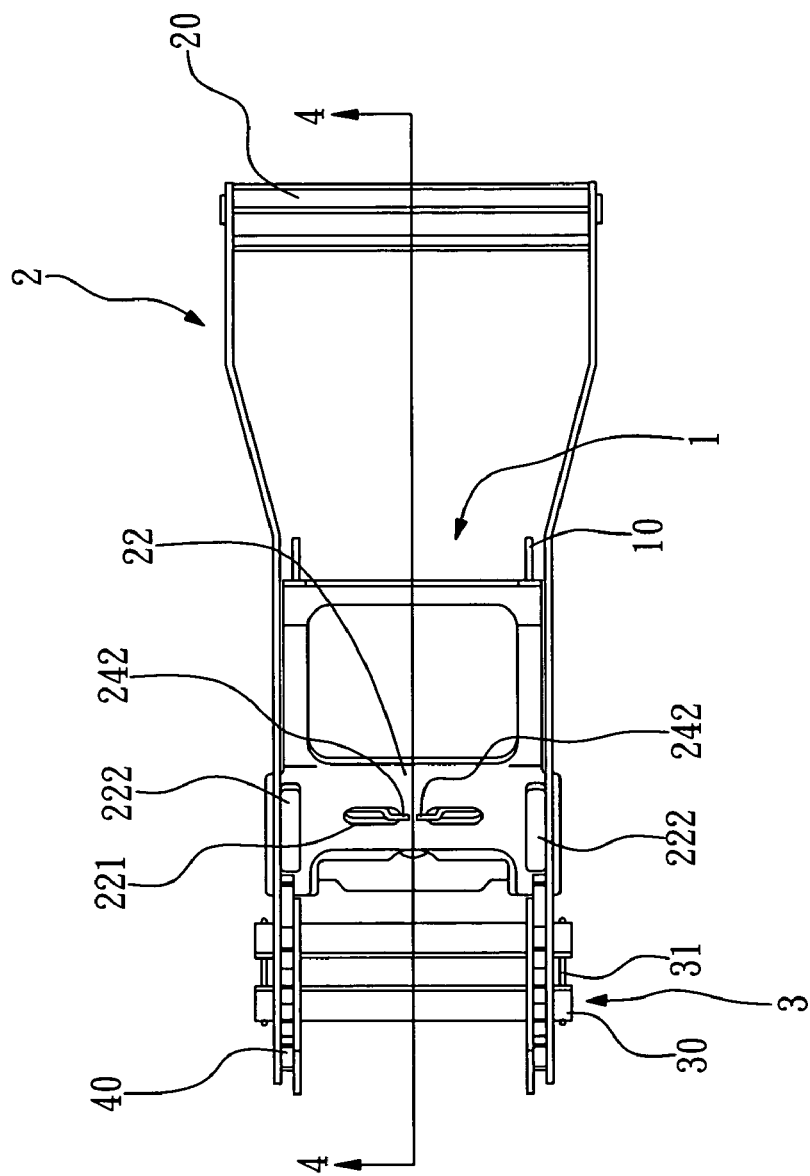
FIG. 3 is a top view of the cable tightening device as shown in FIG. 1.
Figure 4:
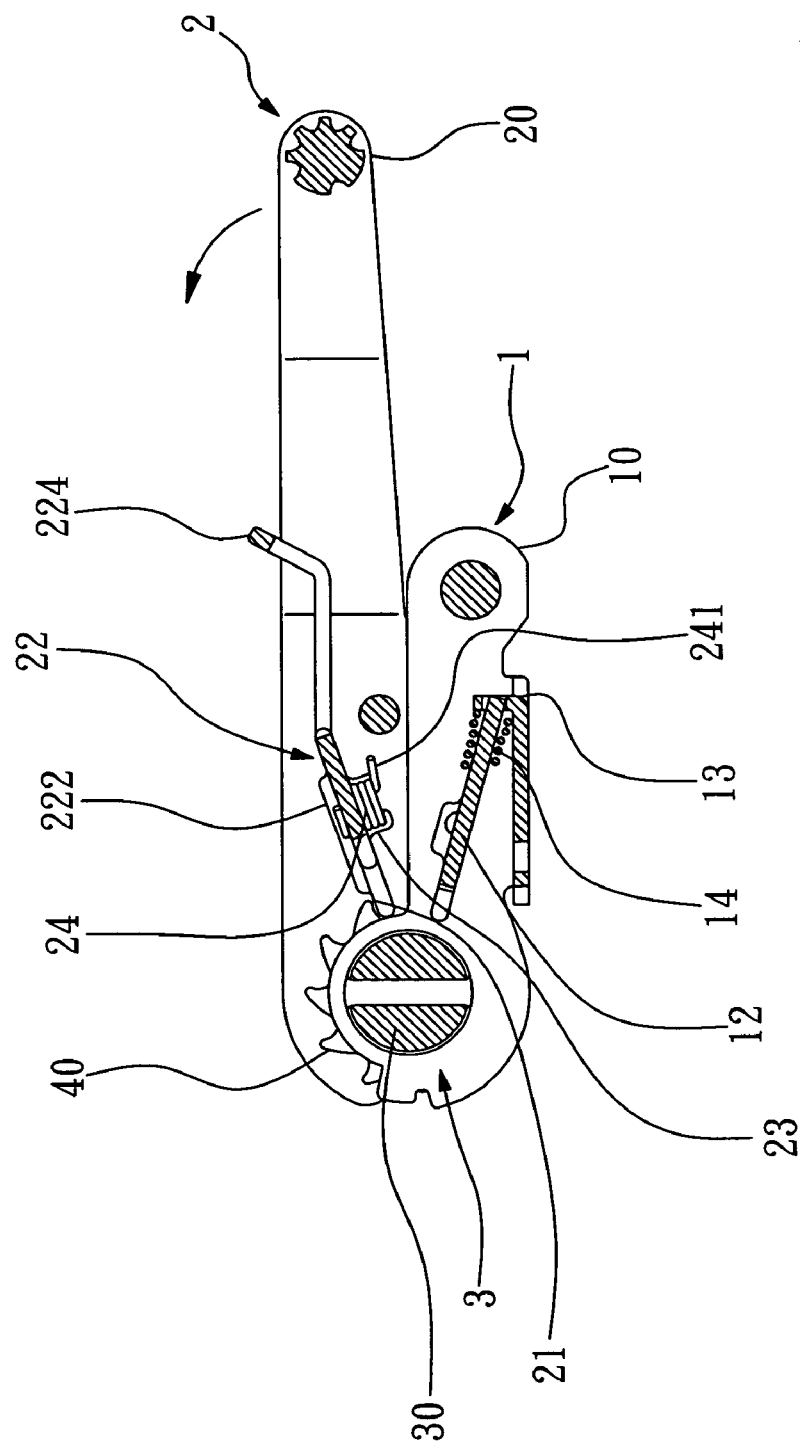
FIG. 4 is a cross-sectional view of the cable tightening device taken along line 4-4 as shown in FIG. 3.

Referring to the drawings and initially to FIGS. 1-4, a cable tightening device in accordance with the preferred embodiment of the present invention comprises a fixed unit 1 including a base member 10, a rotation member 3 rotatably mounted on the base member 10 of the fixed unit 1 to wind or unwind a cable (not shown) by rotation of the rotation member 3, two opposite ratchet wheels 40 secured on two opposite ends of the rotation member 3 to rotate the rotation member 3, and a movable unit 2 including a movable member 20 rotatably mounted on the rotation member 3 and rotatable relative to the base member 10 of the fixed unit 1, a drive handle 22 mounted on and movable with the movable member 20 and releasably engaged with the ratchet wheels 40 to push the ratchet wheels 40 to rotate in a oneway direction when the movable member 20 of the movable unit 2 is rotatable relative to the base member 10 of the fixed unit 1, and two opposite torsion springs 24 each biased between the movable member 20 and the drive handle 22 to push the drive handle 22 toward the ratchet wheels 40.

The fixed unit 1 further includes a stop plate 12 movably mounted on the base member 10 and releasably engaged with the ratchet wheels 40 to limit the ratchet wheels 40 to rotate in the oneway direction, a fixing seat 13 secured on the base member 10, and an elastic member 14 biased between the stop plate 12 and the fixing seat 13 to push the stop plate 12 toward the ratchet wheels 40 so that the stop plate 12 is engaged with the ratchet wheels 40 at a normal state. The base member 10 of the fixed unit 1 has two opposite sidewalls each formed with a guide track 11 to guide movement of the stop plate 12.

The drive handle 22 of the movable unit 2 is movably mounted on the movable member 20 and has two spaced locking grooves 221. The drive handle 22 of the movable unit 2 has a first end formed with two outwardly protruding push plates 220 releasably engaged with the respective ratchet wheels 40 to push the ratchet wheels 40 to rotate in the oneway direction when the movable member 20 of the movable unit 2 is rotatable outwardly relative to the base member 10 of the fixed unit 1. Each of the push plates 220 of the drive handle 22 is provided with a protruding limit block 222. The drive handle 22 of the movable unit 2 has a second end formed with a penetrated grip portion 224 to facilitate a user holding the drive handle 22. The drive handle 22 of the movable unit 2 is movable outwardly relative to the base member 10 of the fixed unit 1 to pull the push plates 220 outwardly relative to the ratchet wheels 40 to detach the push plates 220 from the ratchet wheels 40 so that the push plates 220 of the drive handle 22 skip the ratchet wheels 40 when the movable member 20 of the movable unit 2 is rotatable on the rotation member 3 relative to the base member 10 of the fixed unit 1.

The movable member 20 of the movable unit 2 has two opposite sidewalls each formed with an elongated guide slot 21 to guide movement of the respective push plate 220, wherein the limit block 222 of each of the push plates 220 of the drive handle 22 is rested on a side of the respective guide slot 21 of the movable member 20 so that each of the push plates 220 of the drive handle 22 is slidable in the respective guide slot 21 of the movable member 20 solidly and stably. The guide slot 21 of the movable member 20 has a side formed with a receiving recess 23 to receive a respective torsion spring 24. The receiving recess 23 of the movable member 20 has a middle portion formed with a protruding mounting stud 25.

The torsion springs 24 of the movable unit 2 are arranged on the movable member 20 symmetrically to provide a predetermined elastic force to the drive handle 22. Each of the torsion springs 24 of the movable unit 2 is mounted on the mounting stud 25 of the receiving recess 23 of the movable member 20 and has a first end formed with a first leg 241 rested on a side of the receiving recess 23 of the movable member 20 and a second end formed with a second leg 242 locked in a respective locking groove 221 of the drive handle 22. Thus, the second legs 242 of the torsion springs 24 are located symmetrically at the drive handle 22 to provide an evenly distributed elastic force on the drive handle 22 to drive the drive handle 22 to engage the ratchet wheels 40 exactly and smoothly.

The rotation member 3 includes two semi-circular rods 30 and has two opposite ends each provided with a retaining member 31 rested on the movable member 20 to prevent the movable member 20 from being detached from the rotation member 3.

The ratchet wheels 40 are located between the base member 10 of the fixed unit 1 and the movable member 20 of the movable unit 2.

Figure 5:
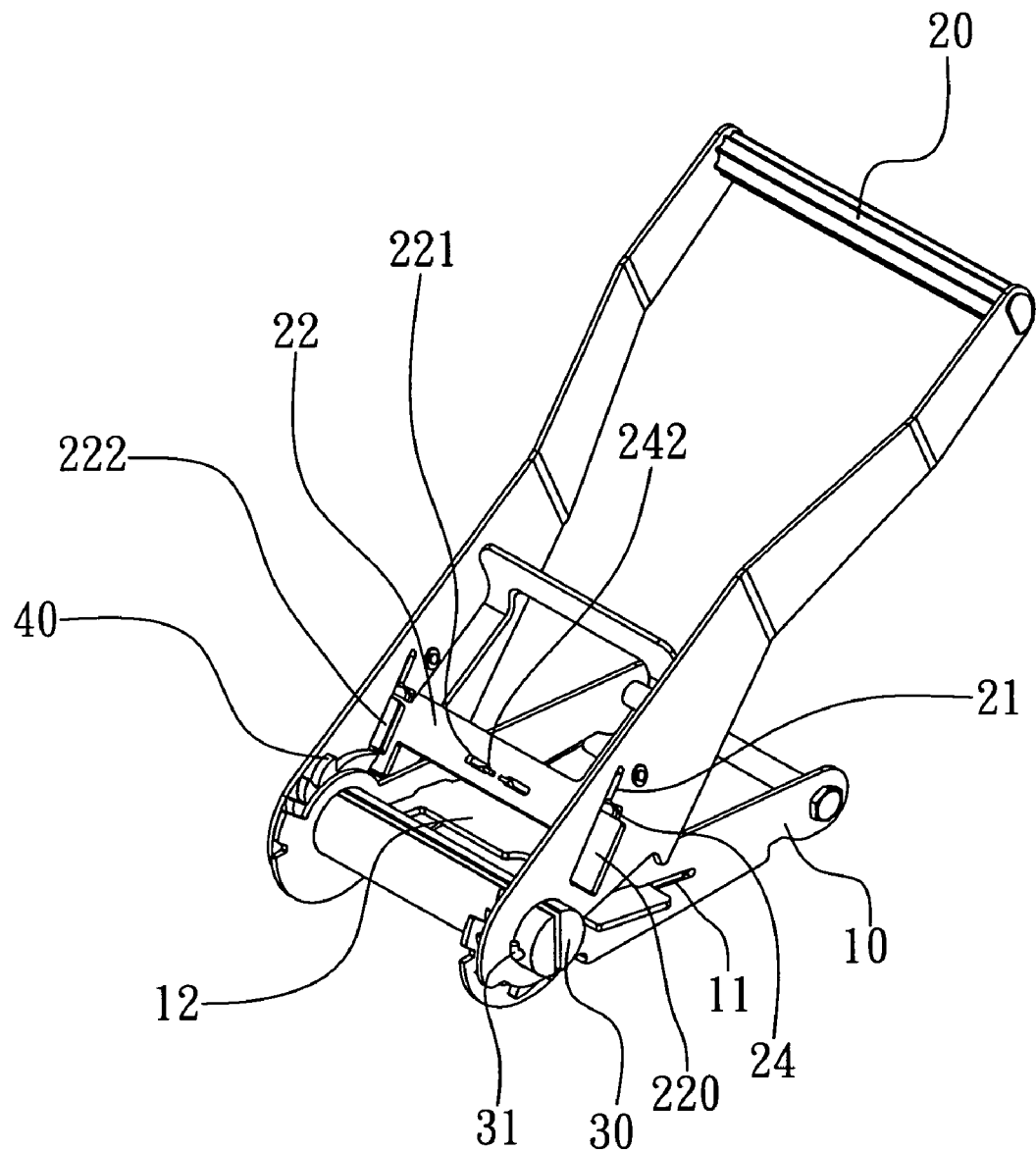
FIG. 5 is a schematic operational view of the cable tightening device as shown in FIG. 1.

In operation, referring to FIGS. 1-6, when the movable member 20 of the movable unit 2 is pivoted outwardly relative to the base member 10 of the fixed unit 1 as shown in FIG. 5, the push plates 220 of the drive handle 22 are moved with the movable member 20 to push and rotate the ratchet wheels 40 which rotates the rotation member 3. On the contrary, when the movable member 20 of the movable unit 2 is pivoted toward the base member 10 of the fixed unit 1 as shown in FIG. 1, the push plates 220 of the drive handle 22 pass by the ratchet wheels 40 so that the rotation member 3 is not rotated. At this time, the ratchet wheels 40 are stopped by the stop plate 12 of the base member 10 to prevent the ratchet wheels 40 from being rotated reversely. Thus, when the movable member 20 of the movable unit 2 is pivoted relative to the base member 10 of the fixed unit 1 in a reciprocal manner as shown in FIGS. 1 and 5, the push plate 220 of the drive handle 22 is moved with the movable member 20 to push the ratchet wheels 40 to rotate in the oneway direction so that the rotation member 3 is rotated successively in the oneway direction to wind the cable successively so as to tighten a cargo.

Figure 6:
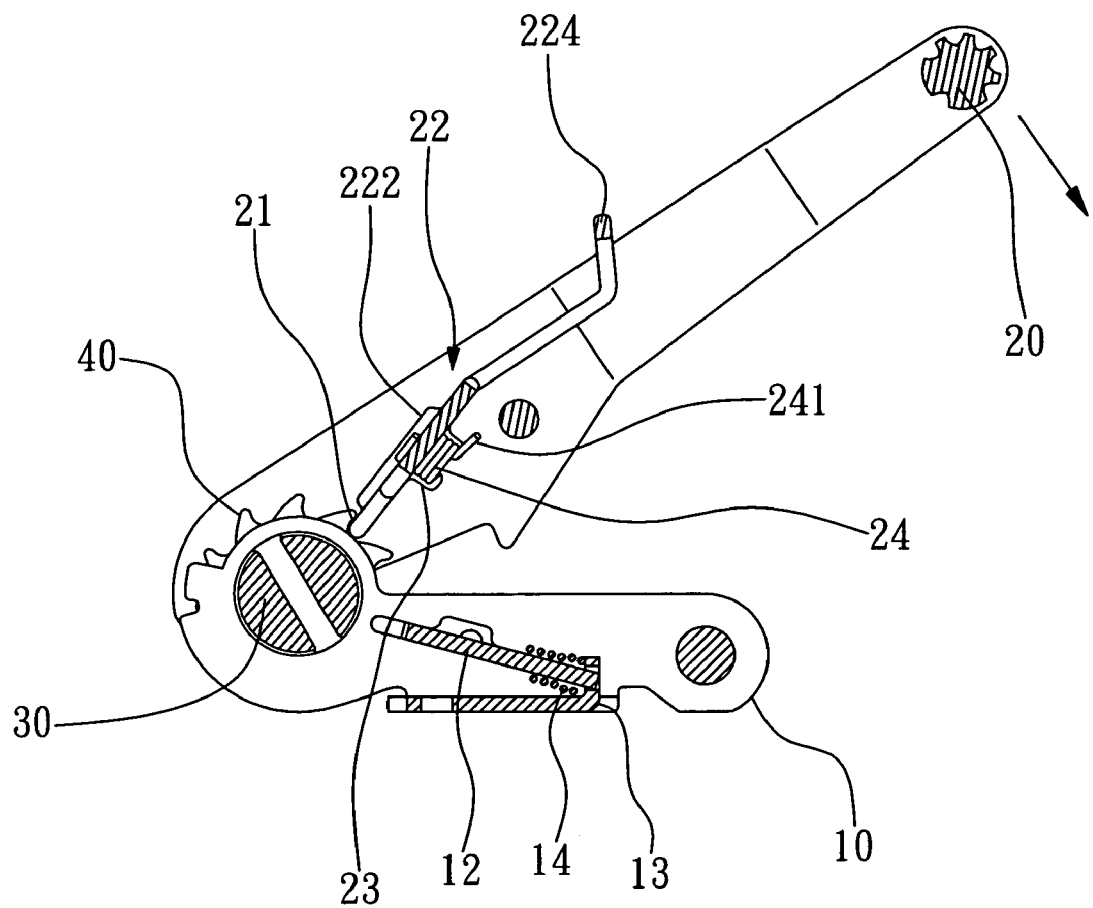
FIG. 6 is a cross-sectional view of the cable tightening device as shown in FIG. 5.
Figure 7:
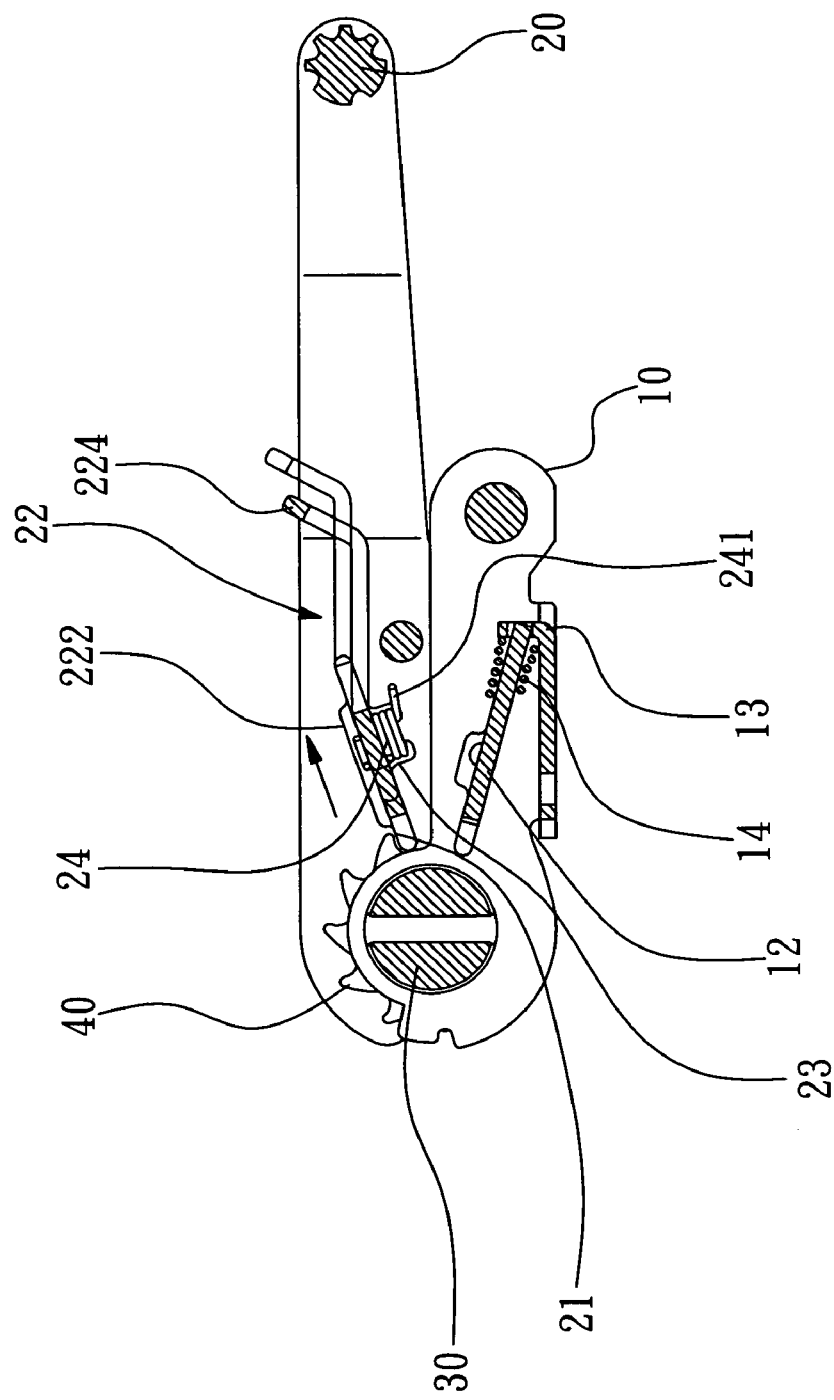
FIG. 7 is a schematic operational view of the cable tightening device as shown in FIG. 6.

As shown in FIGS. 6 and 7, when the cable tightening device is not in use, the drive handle 22 of the movable unit 2 is pulled upwardly to pull the push plates 220 of the drive handle 22 outwardly relative to the ratchet wheels 40 to detach the push plates 220 of the drive handle 22 from the ratchet wheels 40 so that the push plates 220 of the drive handle 22 skips the ratchet wheels 40 when the movable member 20 of the movable unit 2 is rotatable relative to the base member 10 of the fixed unit 1. Thus, the movable member 20 of the movable unit 2 is pivoted freely relative to the base member 10 of the fixed unit 1 until the movable member 20 of the movable unit 2 is rested on the base member 10 of the fixed unit 1 as shown in FIG. 7. At this time, the movable member 20 of the movable unit 2 is disposed at a horizontal state to prevent the movable member 20 from tilting upwardly so as to ensure the driving safety.

When the user wishes to unwind the cable, the drive handle 22 of the movable unit 2 is pulled upwardly to pull the push plates 220 of the drive handle 22 outwardly relative to the ratchet wheels 40 to detach the push plates 220 of the drive handle 22 from the ratchet wheels 40. Then, the stop plate 12 of the fixed unit 1 is pulled upwardly relative to the ratchet wheels 40 to detach from the ratchet wheels 40. Thus, the ratchet wheels 40 are released from the push plates 220 of the drive handle 22 and the stop plate 12 of the fixed unit 1, so that the ratchet wheels 40 are rotatable freely, and the rotation member 3 is rotatable freely in the reverse direction to unwind the cable so as to loosen the cargo.

Accordingly, the torsion springs 24 of the movable unit 2 are arranged on the movable member 20 symmetrically to provide a predetermined elastic force to the drive handle 22 to eliminate an oblique force produced during the movement of the drive handle 22, so that the push plates 220 of the drive handle 22 are slidable in the guide slots 21 of the movable member 20 smoothly and exactly without incurring deflection. In addition, the limit block 222 of each of the push plates 220 of the drive handle 22 is rested on a side of the respective guide slot 21 of the movable member 20 so that each of the push plates 220 of the drive handle 22 is slidable in the respective guide slot 21 of the movable member 20 solidly and stably.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A cable tightening device, comprising:
a fixed unit including a base member;
a rotation member rotatably mounted on the base member of the fixed unit;
two opposite ratchet wheels secured on two opposite ends of the rotation member to rotate the rotation member;
a movable unit including a movable member rotatably mounted on the rotation member and rotatable relative to the base member of the fixed unit, a drive handle mounted on and movable with the movable member and releasably engaged with the ratchet wheels to push the ratchet wheels to rotate in a oneway direction when the movable member of the movable unit is rotatable relative to the base member of the fixed unit, and two opposite torsion springs each biased between the movable member and the drive handle to push the drive handle toward the ratchet wheels.

2. The cable tightening device in accordance with claim 1, wherein the torsion springs of the movable unit are arranged on the movable member symmetrically to provide a predetermined elastic force to the drive handle.

3. The cable tightening device in accordance with claim 1, wherein the drive handle of the movable unit has a first end formed with two outwardly protruding push plates releasably engaged with the respective ratchet wheels to push the ratchet wheels to rotate in the oneway direction when the movable member of the movable unit is rotatable outwardly relative to the base member of the fixed unit.

4. The cable tightening device in accordance with claim 3, wherein the movable member of the movable unit has two opposite sidewalls each formed with an elongated guide slot to guide movement of the respective push plate.

5. The cable tightening device in accordance with claim 4, wherein the guide slot of the movable member has a side formed with a receiving recess to receive a respective torsion spring.

6. The cable tightening device in accordance with claim 5, wherein the receiving recess of the movable member has a middle portion formed with a protruding mounting stud, and each of the torsion springs of the movable unit is mounted on the mounting stud of the receiving recess of the movable member.

7. The cable tightening device in accordance with claim 5, wherein the drive handle of the movable unit has two spaced locking grooves, and each of the torsion springs of the movable unit has a first end formed with a first leg rested on a side of the receiving recess of the movable member and a second end formed with a second leg locked in a respective locking groove of the drive handle.

8. The cable tightening device in accordance with claim 7, wherein the second legs of the torsion springs are located symmetrically at the drive handle to provide an evenly distributed elastic force on the drive handle to drive the drive handle to engage the ratchet wheels.

9. The cable tightening device in accordance with claim 4, wherein each of the push plates of the drive handle is provided with a protruding limit block rested on a side of the respective guide slot of the movable member.

10. The cable tightening device in accordance with claim 4, wherein the torsion springs of the movable unit are mounted symmetrically on the two opposite sidewalls of the movable member of the movable unit.

11. The cable tightening device in accordance with claim 3, wherein the drive handle of the movable unit has a second end formed with a penetrated grip portion to facilitate a user holding the drive handle.

12. The cable tightening device in accordance with claim 1, wherein the drive handle of the movable unit is movably mounted on the movable member.

13. The cable tightening device in accordance with claim 1, wherein the fixed unit further includes a stop plate movably mounted on the base member and releasably engaged with the ratchet wheels to limit the ratchet wheels to rotate in the oneway direction.

14. The cable tightening device in accordance with claim 13, wherein the fixed unit further includes a fixing seat secured on the base member, and an elastic member biased between the stop plate and the fixing seat to push the stop plate toward the ratchet wheels so that the stop plate is engaged with the ratchet wheels at a normal state.

15. The cable tightening device in accordance with claim 14, wherein the base member of the fixed unit has two opposite sidewalls each formed with a guide track to guide movement of the stop plate.

* * * * *